(12) United States Patent
Makimoto et al.

(10) Patent No.: US 7,553,392 B2
(45) Date of Patent: Jun. 30, 2009

(54) METHOD OF MANUFACTURING LIQUID CRYSTAL DISPLAY DEVICE AND ONE DROP FILL APPARATUS USED FOR THE SAME

(75) Inventors: Shota Makimoto, Kawasaki (JP); Satoshi Murata, Kawasaki (JP); Hiroyuki Sugimura, Kawasaki (JP); Tetsuya Kida, Kawasaki (JP); Hidehiko Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 362 days.

(21) Appl. No.: 10/861,175

(22) Filed: Jun. 4, 2004

(65) Prior Publication Data

US 2005/0126700 A1    Jun. 16, 2005

(30) Foreign Application Priority Data

Dec. 10, 2003  (JP) ............................. 2003-411315

(51) Int. Cl.
*G02F 1/13*  (2006.01)
(52) U.S. Cl. ................... 156/285; 349/192; 349/187; 349/191
(58) Field of Classification Search ............... 156/285, 156/64, 145; 118/664; 349/187, 192, 191; 428/1.1; 427/108, 256, 284
See application file for complete search history.

(56) References Cited

U.S. PATENT DOCUMENTS 6,610,364 B1* 8/2003 Kweon et al. ............... 427/256

2001/0026348 A1* 10/2001 Murata et al. ............... 349/187
2003/0012667 A1*  1/2003 Maruyama et al. .......... 417/374
2003/0103185 A1*  6/2003 Kim et al. ................... 349/156
2003/0193628 A1* 10/2003 Kim et al. ..................... 349/56
2003/0231278 A1* 12/2003 Nam et al. ................... 349/190

FOREIGN PATENT DOCUMENTS

| JP | 2001-281678 | 10/2001 |
|---|---|---|
| JP | 2003-295199 | 10/2003 |
| KR | 2003-0076874 | 9/2003 |

* cited by examiner

*Primary Examiner*—Richard Crispino
*Assistant Examiner*—Daniel McNally
(74) *Attorney, Agent, or Firm*—Greer, Burns & Crain, Ltd

(57) ABSTRACT

A method of manufacturing a liquid crystal display device in which liquid crystal is sealed between substrates using a one drop fill method. Dropping of liquid crystal is controlled so that the dropping quantity of the liquid crystal is reduced in an area including the vicinity of a seal material on a side with a relatively narrow cell gap width while the dropping quantity of the liquid crystal is increased in an area including the vicinity of the seal material on a side with a relatively broad cell gap width. Alternatively, dropping of the liquid crystal is controlled so that the number of times the liquid crystal is dropped is reduced in the area including the vicinity of the seal material on one side while the number of times the liquid crystal is dropped is increased in the area including the vicinity of the seal material on another side without changing the dropping quantity of one drop.

10 Claims, 10 Drawing Sheets

METHOD OF MANUFACTURING LIQUID CRYSTAL DISPLAY DEVICE AND ONE DROP FILL APPARATUS USED FOR THE SAME

BACKGROUND OF THE INVENTION

1. Field of the Invention

This invention relates to a method of manufacturing a liquid crystal display device in which liquid crystal is sealed between substrates by using a one drop fill method, and a one drop fill apparatus used for the same.

2. Description of the Related Art

A color liquid crystal display device of an active matrix type has a TFT substrate formed a thin film transistor (TFT) or the like on an insulating substrate, and a CF substrate with a color filter (CF) or the like formed thereon. At a substrate attaching process in a liquid crystal display device manufacturing process, a seal material is applied to the outer peripheral part of either one of the TFT substrate or CF substrate. Next, the two substrates are superimposed and then pressurized and laminated by using a substrate laminating apparatus such as a pressure-heating apparatus or vacuum heating apparatus, thus forming a laminated substrate having a predetermined cell gap width. At a liquid crystal injection step after hardening the seal material, liquid crystal is injected into the cell gap of the laminated substrates by using a vacuum injection technique, and the liquid crystal injection port is sealed.

However, in the vacuum injection technique, it becomes more difficult to evenly inject liquid crystal into the gap as the substrate size increases. Moreover, to facilitate reduction in the cost of liquid crystal panels, simplification of the manufacturing process to improve productivity is demanded. Thus, as a technique for solving these problems, liquid crystal injection using the following one drop fill method is becoming popular. In the one drop fill method, a seal material made of a photosensitive hardening resin or photo and thermo-setting resin is applied in a frame-shape to the outer periphery of one substrate. Next, a predetermined quantity of liquid crystal is dropped on plural parts at predetermined dropping intervals within the frame of the seal material on the substrate. On the other substrate, spherical spacers coated with an adhesive (adhesive spacers) are scattered. Next, the two substrates are carried into a substrate laminating apparatus. One of the substrates is held on a lower plate and the other substrate is held on an upper plate. Next, the upper and lower plates are brought close to each other in a vacuum and the two substrates are laminated to produce a laminated substrate. Next, the atmospheric air is fed into the vacuum chamber to restore the atmospheric pressure, and a cell gap is defined utilizing the difference in pressure between the inside and outside of the laminated substrates. Next, ultraviolet rays (UV rays) are irradiated on the laminated substrates or the laminated substrates are heated after they are irradiated with ultraviolet rays, thus hardening the seal material. Instead of scattering of spherical spacers, pillar spacers made of a resin or the like may be formed on the substrate and the spacer scattering step may be omitted.

Patent Document 1: JP-A-2001-281678

As described above, in the one drop fill method, the substrates on which liquid crystal has been dropped are laminated and then irradiated with UV rays to harden the seal material. Therefore, if the positions where the liquid crystal is dropped are too close to the seal material, the liquid crystal spread by the lamination of the substrates may break the seal material before hardening and may leak out. Moreover, since the components of the seal material before hardening easily elute, if the liquid crystal contacts the seal material before hardening, the seal material components may contaminate and deteriorate the liquid crystal. On the other hand, if the positions where the liquid crystal is dropped are too far from the seal material, the liquid crystal cannot spread sufficiently to the edge of the seal material, generating a bubble area in which the liquid crystal is not injected. If the liquid crystal contaminated and deteriorated by the seal material components or the bubble reaches the display area, an area of uneven display or display defect is generated and the display quality is lowered.

SUMMARY OF THE INVENTION

It is an object of this invention to provide a method of manufacturing a liquid crystal display device using a one drop fill method that enables reduction of product defects of the liquid crystal display device and realization of a stable manufacturing process, and a one drop fill apparatus used for the same.

The foregoing object is achieved by a method of manufacturing a liquid crystal display device using a one drop fill method in which liquid crystal injection is carried out by dropping liquid crystal on a substrate coated with a seal material, causing a liquid crystal dropping side of the substrate to face an opposite substrate, laminating the substrates in a vacuum, and restoring an atmospheric pressure, the method including controlling a dropping position or a dropping quantity of the liquid crystal on the substrate in accordance with a cell gap width between the substrate and the opposite substrate that have been laminated.

According to this invention, in the method of manufacturing a liquid crystal display device in which the liquid crystal is sealed between the substrates using the one drop fill method, products defects of the liquid crystal display device are reduced and a stable manufacturing process can be realized.

DETAILED DESCRIPTION OF THE PREFERRED EMBODIMENTS

First Embodiment

Figure 1A:
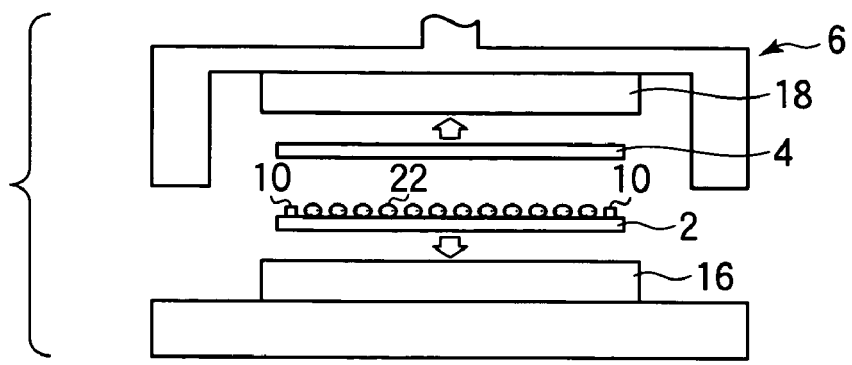
FIGS. 1A to 1E are views for explaining a substrate laminating step and a liquid crystal injection step of a method of manufacturing a liquid crystal display device using a one drop fill method according to a first embodiment of this invention.

A method of manufacturing a liquid crystal display device using a one drop fill method and a one drop fill apparatus according to a first embodiment of this invention will now be described with reference to FIG. 1A to FIG. 6. A substrate laminating step and a liquid crystal injection step for a liquid crystal display device will be described with reference to FIGS. 1A to 1E. As shown in FIG. 1A, a seal material 10 made of, for example, a photosensitive hardening resin, is applied in a frame-shape, for example, on an outer peripheral part of a TFT substrate 2 of two substrates 2 and 4 on which an alignment films are formed. The seal material 10 is formed to a height of approximately 30±5 μm on the TFT substrate 2. On the CF substrate 4 arranged to face the TFT substrate 2, pillar spacers made of a resin are formed or spherical spacers are scattered and adhered.

Next, using a dispenser (not shown), a predetermined quantity of liquid crystal 22 is dropped at predetermined dropping intervals on the inner side of the seal material 10 formed in the frame-shape on the TFT substrate 2.

Next, the TFT substrate 2 and the CF substrate 4 are carried into a substrate laminating apparatus 6. As shown in FIG. 1A, the TFT substrate 2 is held on a lower plate 16 of the substrate laminating apparatus 6 by electrostatic adsorption or the like, and the CF substrate 4 is held on an upper plate 18 by electrostatic adsorption or the like.

Figure 1B:
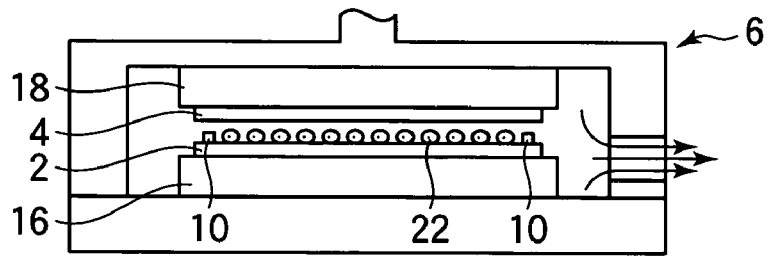

Next, as shown in FIG. 1B, the pressure within the substrate laminating apparatus 6 is gradually reduced and the upper plate 18 is brought closer to the lower plate 16.

Figure 1C:
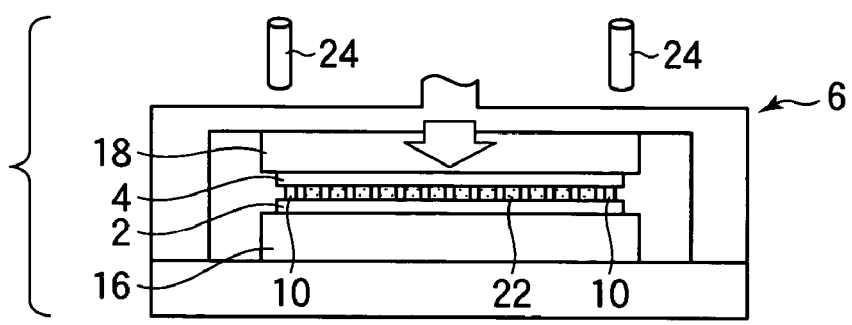

Next, as shown in FIG. 1C, the two substrates 2, 4 are brought sufficiently close to each other and images of alignment marks formed on the two substrates 2 and 4 are picked up by alignment cameras 24 to align and laminate the two substrates 2 and 4. In this case, a pressurizing force of, for example, 150 kgf (=1.47×10³ N), acts between the upper plate 18 and the lower plate 16.

Figure 1D:
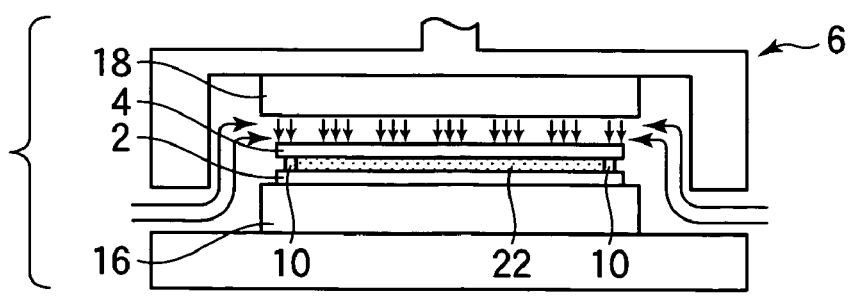

Next, after the CF substrate 4 is released from the upper plate 18, an atmospheric pressure of approximately 1 atm (=101.325 kPa) is restored within the substrate laminating apparatus 6, as shown in FIG. 1D. Because of this, the TFT substrate 2 and the CF substrate 4 facing each other via the spacers are further pressurized by the atmospheric pressure. The gap (cell gap) between the TFT substrate 2 and the CF substrate 4 becomes even and the liquid crystal 22 spreads evenly within the frame of the seal material 10.

Figure 1E:
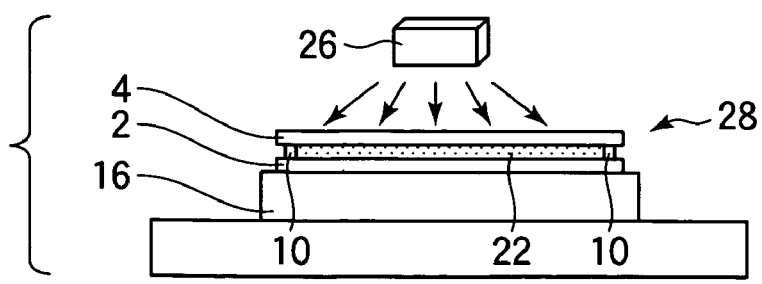

Next, as shown in FIG. 1E, ultraviolet rays are irradiated on the seal material 10 made of the photosensitive hardening resin from an ultraviolet (UV) light source 26 and the seal material 10 is hardened. A liquid crystal display panel 28 is thus completed.

Figure 2A:
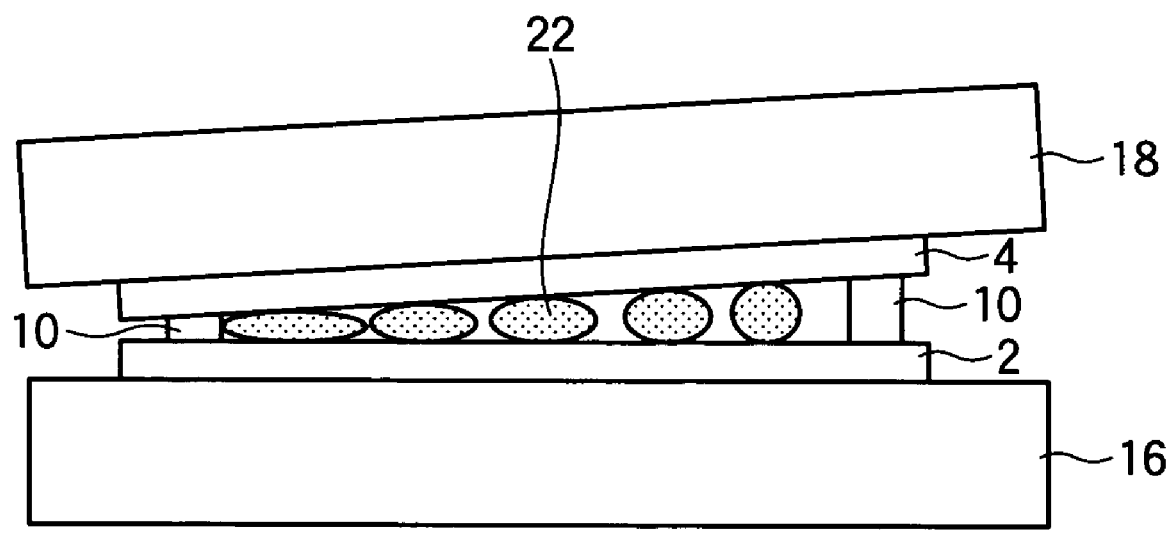
FIGS. 2A and 2B are sectional views showing a spreading state of liquid crystal 22 in the case where the degree of parallelism between the facing surfaces of an upper plate 18 and a lower plate 16 is low, in the method of manufacturing a liquid crystal display device using a one drop fill method according to the first embodiment of this invention.
Figure 2B:
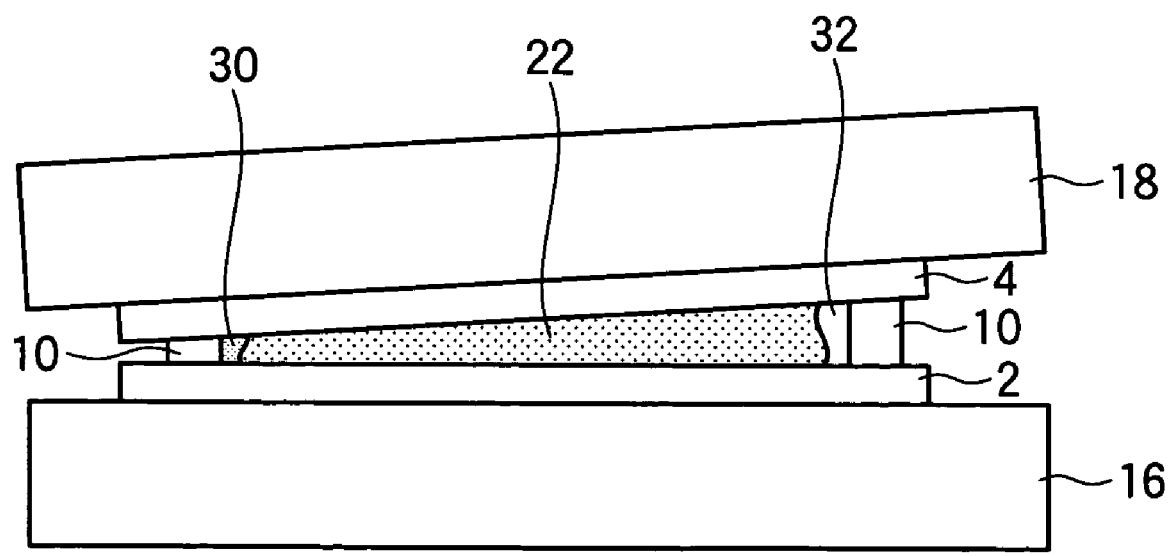

If the degree of parallelism between the facing surfaces of the upper plate 18 and the lower plate 16 is low and the setting surface for the CF substrate 4 on the upper plate 18 is inclined to the setting surface for the TFT substrate 2 on the lower plate 16, the facing surfaces of the TFT substrate 2 and the CF substrate 4 are inclined to each other, too, and the cell gap becomes uneven. If the cell gap is uneven, the liquid crystal 22 spreads unevenly within the frame of the seal material 10. FIGS. 2A and 2B are sectional views showing a spreading state of the liquid crystal 22 in the case where the degree of parallelism between the facing surfaces of the upper plate 18 and the lower plate 16 is low. In FIG. 2A, when the upper plate 18 is inclined with its left side down to the lower plate 16, the cell gap in an area including the vicinity of the seal material 10 on the left side is relatively narrowed. Therefore, in the area with this narrow cell gap, the quantity of the liquid crystal 22 is excessive compared with the other areas and the spreading speed of the liquid crystal 22 is relatively high. On the other hand, the cell gap in an area including the seal material 10 on the right side is relatively broadened. Therefore, in the area with this broad cell gap, the quantity of the liquid crystal 22 is too small compared with the other areas and the spreading speed of the liquid crystal 22 is relatively low.

As a result, in the area with the relatively narrow cell gap near the seal material 10 on the left side, the liquid crystal 22 may contact the unhardened seal material 10 and the components of the seal material 10 may elute into the liquid crystal 22, thus generating a contamination area 30 contaminating the liquid crystal 22, as shown in FIG. 2B. On the other hand, in the area with the relatively broadened cell gap near the seal material 10 on the right side, the spreading speed of the liquid crystal 22 becomes lower toward the seal material 10 and the liquid crystal 22 may finally stop spreading before reaching the seal material 10, generating a non-injection area 32 where the liquid crystal 22 is not injected within the frame of the seal material 10.

Thus, in this embodiment, in the one drop fill method in which liquid crystal injection is carried out by dropping the liquid crystal 22 on the TFT substrate 2 formed with the seal material 10, causing the liquid crystal dropping side of the TFT substrate 2 to face the CF substrate 4, laminating the two substrates and then restoring the atmospheric pressure, the cell gap width between the laminated TFT substrate 2 and CF substrate 4 is found in advance and the dropping position or dropping quantity of the liquid crystal 22 on the TFT substrate 2 (or CF substrate 4) is controlled. Particularly this embodiment is characterized in that the dropping position, the dropping quantity, the number of times the liquid crystal is dropped, or a combination of these is controlled in accordance with the distribution of the cell gap width that is found in advance.

Figure 3A:
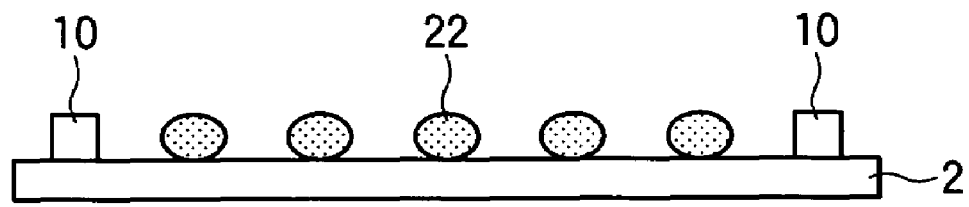
FIGS. 3A to 3C are sectional views showing states where the liquid crystal 22 is dropped on a TFT substrate 2 in the method of manufacturing a liquid crystal display device using a one drop fill method according to the first embodiment of this invention.
Figure 3B:
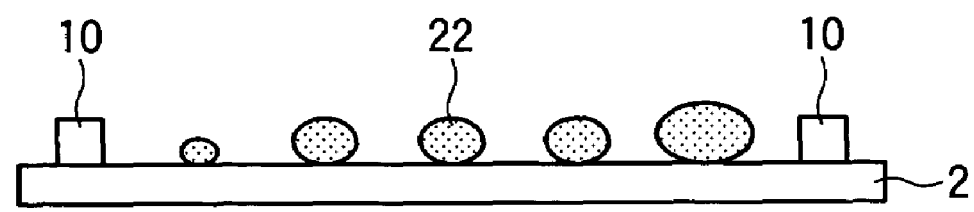
Figure 3C:
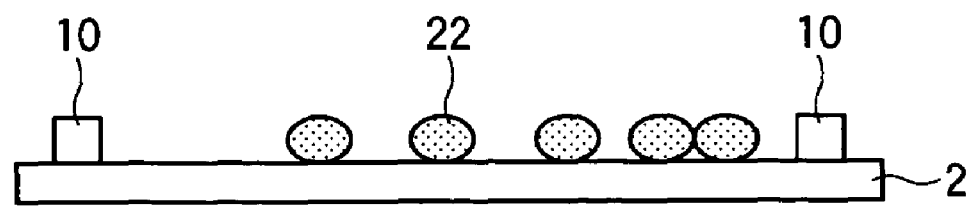

FIGS. 3A to 3C are sectional views showing states where the liquid crystal is dropped on the TFT substrate 2. FIG. 3A shows a reference dropping control state where the quantity of one drop of the liquid crystal 22 is made even. FIG. 3B shows a dropping control state where the dropping quantity of the liquid crystal 22 dropped in areas including the vicinities of the seal material 10 is changed from the dropping quantity in the reference dropping state. FIG. 3C shows a dropping control state where the number of times the liquid crystal 22 is dropped in the areas including the vicinities of the seal material 10 is changed.

First, plural liquid crystal display panels 28 for measuring the cell gap width are manufactured using the manufacturing method shown in FIGS. 1A to 1E. In the dropping of the liquid crystal in manufacturing the liquid crystal display panels 28 for measuring the cell gap width, the total dropping quantity, the dropping position and the dropping quantity per drop are controlled by reference dropping control based on designed values (see FIG. 3A). Next, the cell gap width is measured at plural positions within the frames of the seal materials 10 of the manufactured plural liquid crystal display panels 28 for measuring the cell gap width, and the distribution of the cell gap width is found. In this embodiment, the distribution of the cell gap width in the state where the TFT substrate 2 and the CF substrate 4 are inclined with respect to each other as shown in FIGS. 2A and 2B will be described as an example hereinafter.

FIG. 3B shows the dropping control state where the dropping quantity of the liquid crystal 22 dropped in the areas including the vicinity of the seal material 10 is changed without changing the dropping position of the liquid crystal 22, on the basis of the distribution of the cell gap width acquired in advance. According to the predicted distribution of the cell gap width, the cell gap is relatively narrow in the area including the vicinity of the seal material 10 on the left side and the cell gap is relatively broad in the area including the vicinity of the seal material 10 on the right side. Therefore, the dropping quantity is controlled so that the dropping quantity of the liquid crystal 22 in the area including the vicinity of the seal material 10 on the left side is reduced while the dropping quantity of the liquid crystal 22 in the area including the vicinity of the seal material 10 on the right side is increased. Since the average width of the cell gap varies depending on the total dropping quantity of the liquid crystal 22 dropped within the frame of the seal material 10, the dropping quantity per drop of the liquid crystal 22 at each dropping position is adjusted so that the total dropping quantity does not change from the total dropping quantity in the reference dropping state.

As the liquid crystal 22 is dropped on the TFT substrate 2 under the dropping control shown in FIG. 3B and the TFT substrate 2 and the CF substrate 4 are laminated by the technique shown in FIGS. 1A to 1E, the CF substrate 4 is inclined with its left side down to the TFT substrate 2 and the cell gap in the area including the vicinity of the seal material 10 on the left side is relatively narrowed, as in the case shown in FIG. 2A. However, since the dropping quantity of the liquid crystal 22 in this area is reduced, the quantity of the liquid crystal is not excessive compared with the other areas and the spreading speed is substantially equal to the spreading speed in the reference dropping control state. Meanwhile, the cell gap in the area including the vicinity of the seal material 10 on the right side is relatively broadened. However, since the dropping quantity of the liquid crystal 22 in this area is increased, the quantity of the liquid crystal is not too small compares with the other areas and the spreading speed is substantially equal to the spreading speed in the reference dropping control state.

As a result, the dropping quantity and the spreading speed of the liquid crystal 22 in the cell gap are even irrespective of position and are equal to those in the reference dropping control state. Therefore, it is possible to manufacture the liquid crystal display panel 28 in which the liquid crystal 22 does not contact the unhardened seal material 10 and the contamination area 30 is not generated, or in which the non-injection area 32 is not generated where the liquid crystal 22 is not injected within the frame of the seal material 10.

FIG. 3C shows the dropping control state where the number of times the liquid crystal 22 is dropped in the areas including the vicinities of the seal material 10 is changed on the basis of the distribution of the cell gap width acquired in advance. In this dropping control, the dropping quantity of one drop is not changed and is kept equal to the dropping quantity in the reference dropping control state, and the number of times the liquid crystal 22 is dropped is reduced in the area including the vicinity of the seal material 10 on the left side where the cell gap is relatively narrow while the number of times the liquid crystal 22 is dropped is increased in the area including the vicinity of the seal material 10 on the right side.

As the liquid crystal 22 is dropped on the TFT substrate 2 under the dropping control shown in FIG. 3C and the TFT substrate 2 and the CF substrate 4 are laminated by the technique shown in FIGS. 1A to 1E, the CF substrate 4 is inclined with its left side down to TFT substrate 2 and the cell gap in the area including the vicinity of the seal material 10 on the left side is relatively narrowed, as in the case shown in FIG. 2A. However, since the number of times the liquid crystal 22 is dropped in this area is reduced and the dropping quantity is thus reduced, the quantity of the liquid crystal is not excessive compared with the other areas and the spreading speed is substantially equal to the spreading speed in the reference dropping control state. Meanwhile, the cell gap in the area including the vicinity of the seal material 10 on the right side is relatively broadened. However, since the number of times the liquid crystal 22 is dropped in this area is increased and the dropping quantity is thus increased, the quantity of the liquid crystal is not too small compared with the other areas and the spreading speed is substantially equal to the spreading speed in the reference dropping control state.

If the total number of drops within the frame of the seal material 10 is made equal to the number of drops in the reference dropping control state, the total dropping quantity of the liquid crystal 22 will be the same as the total dropping quantity in the reference dropping control state, and the average width of the cell gap can be made equal to the average width of the cell gap in the reference dropping control state.

As this is done, the dropping quantity and the spreading speed of the liquid crystal 22 within the cell gap become even irrespective of position and become substantially equal to those in the reference dropping control state. Therefore, it is possible to manufacture the liquid crystal display panel 28 in which the liquid crystal 22 does not contact the unhardened seal material 10 and the contamination area 30 is not generated, or in which the non-injection area 32 is not generated where the liquid crystal 22 is not injected within the frame of the seal material 10.

Figure 4:
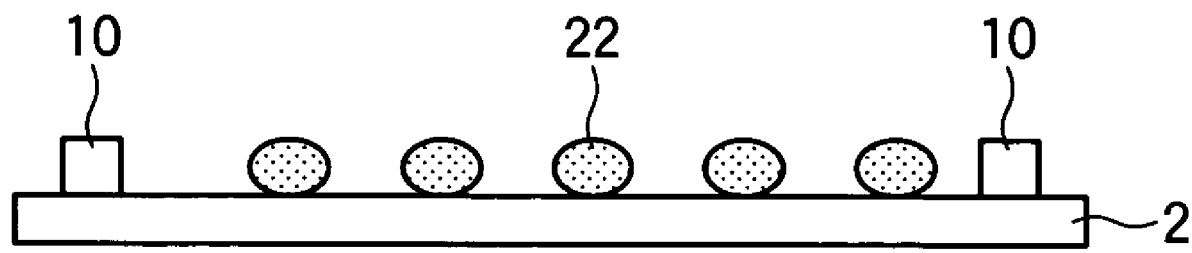
FIG. 4 is a sectional view showing a state where the liquid crystal 22 is dropped on the TFT substrate 2 in the method of manufacturing a liquid crystal display device using a one drop fill method according to the first embodiment of this invention.

FIG. 4 is a sectional view of the state where the liquid crystal 22 is dropped on the TFT substrate 2. It shows the dropping control state where the dropping position of the liquid crystal 22 in the areas including the vicinities of the seal material 10 is changed on the basis of the distribution of the cell gap width acquired in advance. In this dropping control, the dropping quantity of one drop is not changed and is kept equal to the dropping quantity in the reference dropping control state, and the dropping position of the liquid crystal 22 in the area including the vicinity of the seal material 10 on the left side where the cell gap is relatively narrow is moved away from the seal material 10 in the vicinity while the dropping position of the liquid crystal 22 in the area including the vicinity of the seal material 10 on the right side where the cell gap is relatively broad is moved closer to the seal material 10 in the vicinity.

As the liquid crystal 22 is dropped on the TFT substrate 2 under the dropping control shown in FIG. 4 and the TFT substrate 2 and the CF substrate 4 are laminated by the technique shown in FIGS. 1A to 1E, the CF substrate 4 is inclined with its left side down to TFT substrate 2 and the cell gap in the area including the vicinity of the seal material 10 on the left side is relatively narrowed, as in the case shown in FIG. 2A. However, since the dropping position of the liquid crystal 22 in this area is away from the seal material 10 in the vicinity, the spreading speed of the liquid crystal 22 in this area with the narrow cell gap is relatively increased compared with the other areas. Because of the long distance to the seal material 10, the liquid crystal 22 reaches the unhardened seal material 10 in a time period substantially equal to the time period in the reference dropping control state. Meanwhile, the cell gap in the area including the vicinity of the seal material 10 on the right side is relatively broadened. However, since the dropping position of the liquid crystal 22 in this area is closer to the seal material 10 in the vicinity, the spreading speed of the liquid crystal 22 in this area with the broad cell gap is relatively lowered compared with the other areas. Because of the short distance to the seal material 10, the liquid crystal 22 reaches the unhardened seal material 10 in a time period substantially equal to the time period in the reference dropping control state.

If the total number of drops within the frame of the seal material 10 is made equal to the number of drops in the reference dropping control state, the total dropping quantity of the liquid crystal 22 will be the same as the total dropping quantity in the reference dropping control state, and the average width of the cell gap can be made equal to the average width of the cell gap in the reference dropping control state. Therefore, it is possible to manufacture the liquid crystal display panel 28 in which the liquid crystal 22 does not contact the unhardened seal material 10 and the contamination area 30 is not generated, or in which the non-injection area 32 is not generated.

Figure 5:
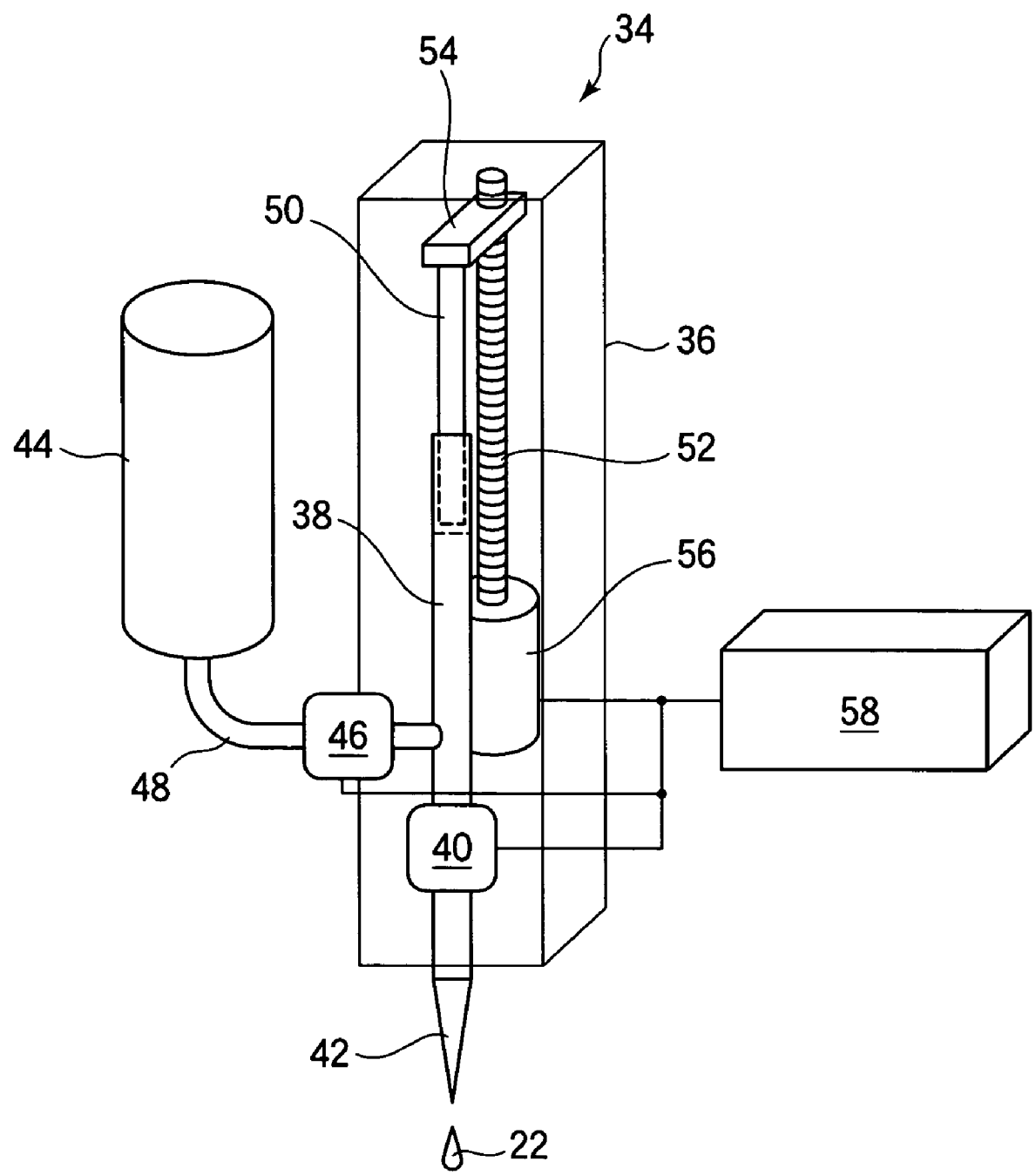
FIG. 5 is a perspective view showing a schematic structure of a dispenser 34 used in a one drop fill apparatus 60 according to the first embodiment of this invention.
Figure 6:
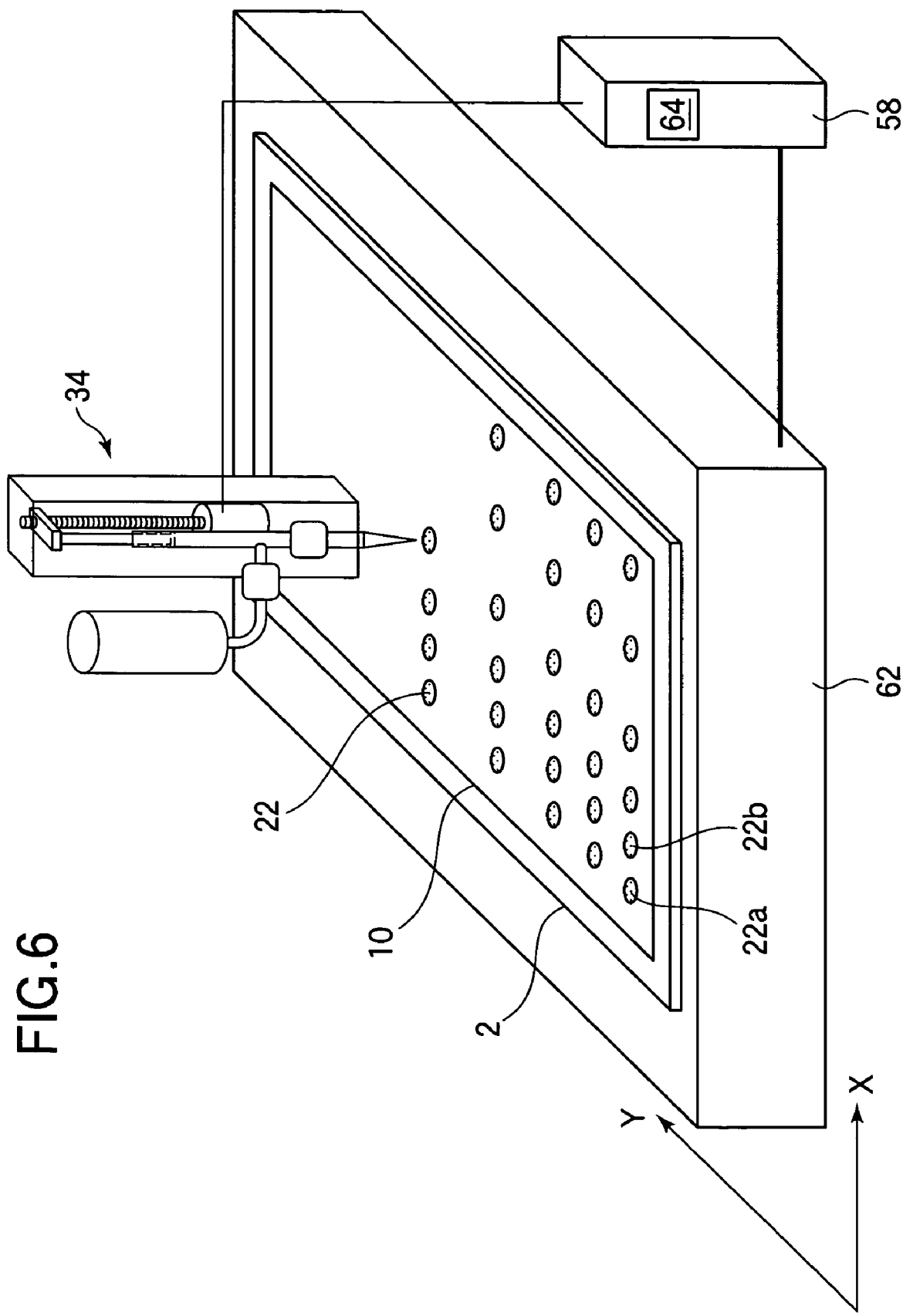
FIG. 6 is a perspective view showing a schematic structure of the one drop fill apparatus 60 according to the first embodiment of this invention.

Now, a one drop fill apparatus used for the method of manufacturing a liquid crystal display device according to this embodiment will be described with reference to FIGS. 5 and 6. FIG. 5 is a perspective view showing a schematic structure of a dispenser 34 used in the one drop fill apparatus. In FIG. 5, the dispenser 34 has a hollow rectangular solid-shaped casing 36 and is used with the central axis of the rectangular solid standing substantially vertically. Inside the casing 36, a hollow cylindrical syringe 38 is arranged substantially parallel to the central axis of the casing 36. One end of the syringe 38 is connected to a nozzle 42 provided at a lower end in the vertical direction of the casing 36 via a dropping control valve 40 for controlling dropping of the liquid crystal 22. On a sidewall of the casing 36 near the dropping control valve 40, a supply control valve 46 for supplying the liquid crystal 22 in a liquid crystal tank 44 to the casing 36 is provided so that the liquid crystal 22 can flow into the syringe 38 via a supply tube 48.

Inside the other end of the syringe 38, one end of an elongated stick-like plunger rod 50 is inserted with its outer wall contacting the inner wall of the syringe 38. The plunger rod 50 is supported in such a manner that it is vertically movable. The liquid crystal 22 supplied in the syringe 38 is dropped from the nozzle 42, depending on the quantity of movement of the distal end of the plunger rod 50. Because of its own surface tension, the liquid crystal 22 is not ejected from the nozzle 42 unless an external force is applied.

In the casing 36, a ball screw 52 is arranged substantially parallel to the central axis of the casing 36. On end of the ball screw 52 is rotatably supported by an axial end bearing unit (not shown) provided in the casing 36, and its other end is connected to a rotary shaft of a motor 56. A slider 54 is attached to the ball screw 52 via a ball bearing. As the motor 56 is driven to rotate the ball screw 52, the slider 54 can be moved vertically. As a stepping motor or servo motor is used for the motor 56, the slider 54 can be positioned vertically with high precision and high resolution. The other end of the plunger rod 50 is fixed to the slider 54. As the slider 54 is moved and positioned vertically with high precision, the quantity of movement of the distal end of the plunger rod 50 can be accurately controlled. This enables broad-range and high-resolution control of the quantity of one drop of the liquid crystal 22 which is charged in the syringe 38 and nozzle 42, then pushed down and dropped from the distal end of the nozzle 42.

A controller 58 controls the motor 56, the supply control valve 46 and the dropping control valve 40, so that the dispenser 34 drops a predetermined quantity of the liquid crystal 22 onto a substrate (not shown). The control procedures include opening the supply control valve 46 in the state where the dropping control valve 40 is closed, and then driving the motor 56 to rotate the ball screw 52 in a predetermined rotating direction, thus bringing the plunger rod 50 back to its initial position. As this is done, the liquid crystal 22 in the liquid crystal tank 44 is sucked in the syringe 38 and the inside of the syringe 38 is filled with the liquid crystal 22. Next, the supply control valve 46 is closed and the dropping control valve 40 is opened. Then, the motor 56 is driven to rotate the ball screw 52 by a predetermined quantity, thus vertically moving the slider 54 down by a predetermined quantity. The distal end of the plunger rod 50 pushes down the liquid crystal 22 charged in the syringe 38. A predetermined quantity of the liquid crystal 22 is thus dropped from the distal end of the nozzle 42. As these operations are repeated, the liquid crystal 22 can be sequentially dropped on the substrate. By changing the quantity of rotation of the motor 56 for each dropping, it is possible to arbitrarily change the dropping quantity of the liquid crystal 22 dropped on the substrate.

Now, a schematic structure of a one drop fill apparatus 60 using the dispenser 34 will be described with reference to FIG. 6. FIG. 6 is a perspective view showing a schematic structure of the one drop fill apparatus 60. The one drop fill apparatus 60 has a flat plate-like substrate stage 62 on which the TFT substrate 2 can be set, and the dispenser 34 arranged above the substrate stage 62. The substrate stage 62 is controlled by the controller 58 and can shift within an xy-plane relatively to the dispenser 34. The quantities of movement in the direction of x-axis and the direction of y-axis shown in FIG. 6 can be arbitrarily varied during dropping of the liquid crystal 22. The controller 58 has a storage unit 64. In the storage unit 64, the dropping position of the liquid crystal 22 and the dropping quantity of one drop based on the distribution of the cell gap width are stored.

The operation of the one drop fill apparatus 60 will now be described. First, in the initial state, the controller 58 controls the substrate stage 62 so that the dispenser 34 is positioned at a predetermined position on the TFT substrate 2 (for example, at the lower left corner part in FIG. 6). Next, the controller 58 controls the dispenser 34 on the basis of the information of the dropping position and the dropping quantity of the liquid crystal 22 stored in the storage unit 64, thus causing the dispenser 34 to drop one drop of liquid crystal 22a within the frame of the seal material 10 on the TFT substrate 2. Next, on the basis of the information of the dropping position, the controller 58 shifts the substrate stage 62 within the xy-plane relatively to the dispenser 34 and positions the substrate stage 62 at a predetermined position. Next, the controller 58 controls the dispenser 34 on the basis of the information of the dropping quantity, thus causing the dispenser 34 to drop one drop of liquid crystal 22b. The foregoing operation is repeated to sequentially drop the liquid crystal 22 on the TFT substrate 2. Since the dropping position of the liquid crystal 22 and the dropping quantity per drop are stored in the storage unit 64, the dropping position and the dropping quantity of the liquid crystal 22 can be controlled for each drop. For example, it is possible to reduce the dropping quantity per drop or move the dropping position of the liquid crystal 22 away from or closer to the seal material 10 only in the case of dropping the liquid crystal 22 near the seal material 10. A structure in which the dispenser 34 can shift relatively to the substrate stage 62 may also be employed.

According to this embodiment, the dropping position, the dropping quantity, the number of times the liquid crystal is dropped, or a combination of these in the dropping of the liquid crystal can be controlled in accordance with the distribution of the cell gap width found in advance. This can satisfactorily reduce the possibility that the liquid crystal 22 contacts the seal material 10 and the components of the seal material 10 elute and contaminate the liquid crystal 22 even if the cell gap in the area including the vicinity of the seal material 10 is relatively narrow. Since the liquid crystal 22 can reach the end of the seal material 10 even if the cell gap in the area including the vicinity of the seal material 10 is relatively broad, the possibility of occurrence of an area where the liquid crystal 22 is not injected can be satisfactorily reduced. Moreover, the liquid crystal 22 can be evenly spread in the cell gap even if the cell gap width is unevenly distributed. Furthermore, the one drop fill apparatus 60 can arbitrarily vary the dropping quantity per drop and the dropping position in the step of dropping the liquid crystal 22 on the TFT substrate 2. For example, in a conventional dispenser with a fixed dropping quantity per drop, to increase the dropping quantity of the liquid crystal 22 at a predetermined position, the liquid crystal 22 must be dropped at that position plural times. However, in the one drop fill apparatus 60 of this embodiment, since the dropping quantity per drop can be easily increased or decreased, the liquid crystal 22 of a desired dropping quantity can be dropped in one drop. This enables reduction in production defects of the liquid crystal display device without increasing the tact time in the step of dropping the liquid crystal 22.

Second Embodiment

Figure 7A:
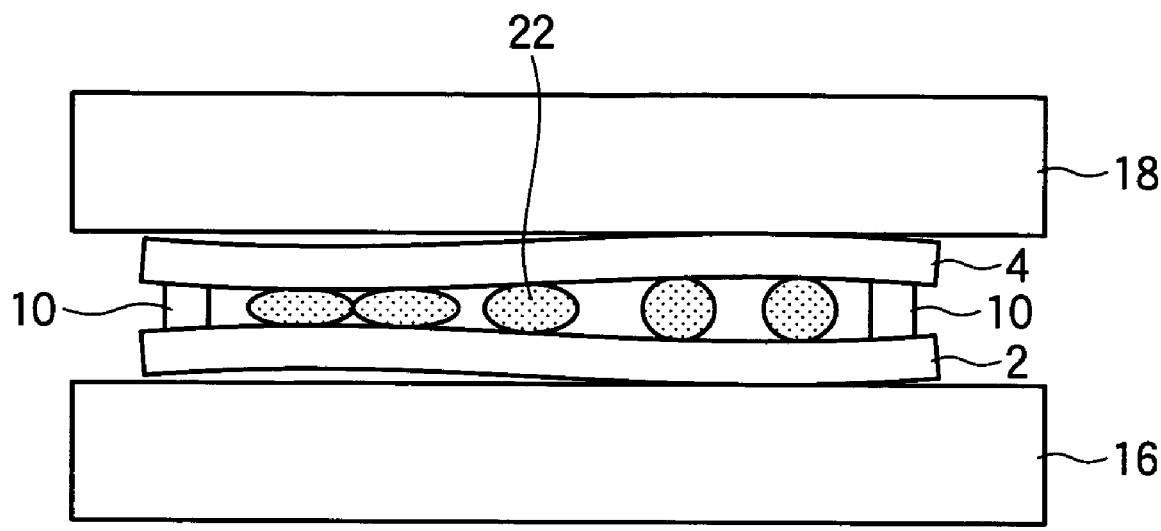
FIGS. 7A and 7B are sectional views showing a spreading state of liquid crystal 22 on a TFT substrate 2 and a CF substrate 4 which are distorted, in a method of manufacturing a liquid crystal display device using a one drop fill method according to a second embodiment of this invention.
Figure 7B:
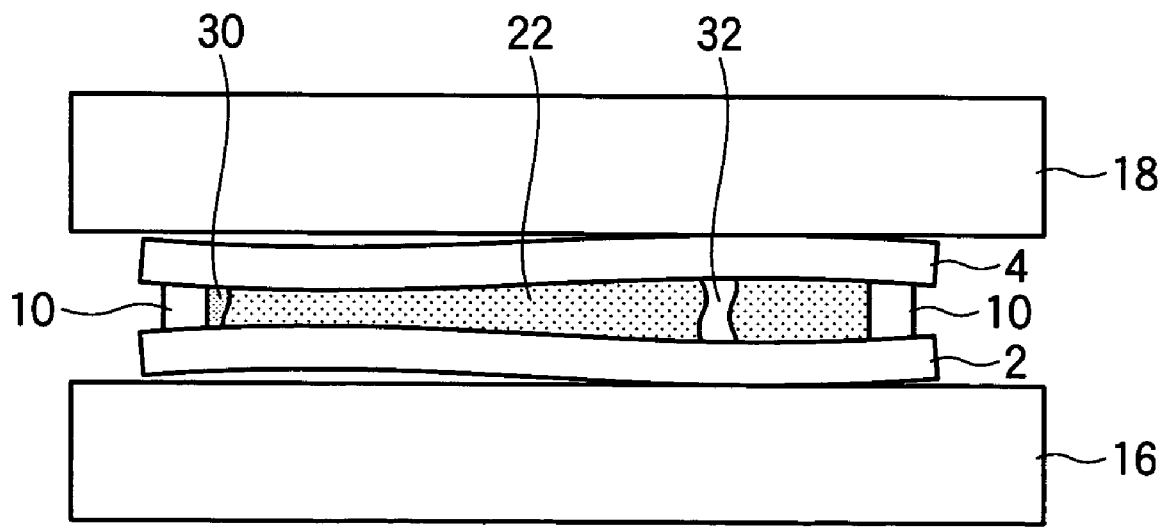

Now, a method of manufacturing a liquid crystal display device using a one drop fill method and a one drop fill apparatus used in the method according to a second embodiment of this invention will be described with reference to FIG. 7A to FIG. 9. FIGS. 7A and 7B are sectional views showing the spreading state of the liquid crystal 22 on the TFT substrate 2 and the CF substrate 4 with their substrate surfaces flexed and distorted. FIG. 7A is a sectional view showing a state where the liquid crystal 22 is spreading in the cell gap between the TFT substrate 2 and the CF substrate 4. FIG. 7B is a sectional view showing a state where the liquid crystal 22 is spread within the frame of the seal material 10. Constituent elements having the same effects and functions as the constituent elements in the method of manufacturing a liquid crystal display device and the one drop fill apparatus 60 used for the method of the first embodiment shown in FIG. 1A to FIG. 4 are denoted by the same numerals and will not be described further in detail.

The TFT substrate 2 is set on the lower plate 16 as a predetermined area within the plane of the TFT substrate 2 is electrostatically adsorbed or vacuum-sucked. Similarly, the CF substrate 4 is set on the upper plate 18 as a predetermined area within the surface of the CF substrate 4 is electrostatically adsorbed or vacuum-sucked. However, as shown in FIG. 7A, because of uneven adsorption or suction, an adsorption area and a non-adsorption area may be generated within the surfaces of the TFT substrate 2 and the CF substrate 4, distorting the TFT substrate 2 and the CF substrate 4. If the positions where alignment marks are formed on the TFT substrate 2 and the CF substrate 4 are shifted from each other, the TFT substrate 2 and the CF substrate 4 may be distorted when the TFT substrate 2 and the CF substrate 4 are laminated. If such distortion occurred on the substrate surfaces, the cell gap width is unevenly distributed. In an area with a relatively narrow cell gap, the quantity of the liquid crystal 22 is excessive compared with the other areas and the spreading speed is relatively increased. On the other hand, in an area with a relatively broad cell gap, the quantity of the liquid crystal 22 is too small compared with the other areas and the spreading speed is relatively lowered.

As a result, if the area with the relatively narrow cell gap is generated near the seal material 10, the liquid crystal 22 contacts the unhardened seal material 10 and the components of the seal material 10 may elute into the liquid crystal 22, generating the contamination area 30 contaminating the liquid crystal 22, as shown in FIG. 7B. On the other hand, in the area with the relatively broad cell gap, the liquid crystal 22 may not be fully spread, generating the non-injection area 32 where the liquid crystal 22 is not injected. Thus, in this embodiment, the dropping position, the dropping quantity, the number of times the liquid crystal is dropped, or a combination of these is controlled in accordance with the distribution of the cell gap width found in advance.

Figure 8:
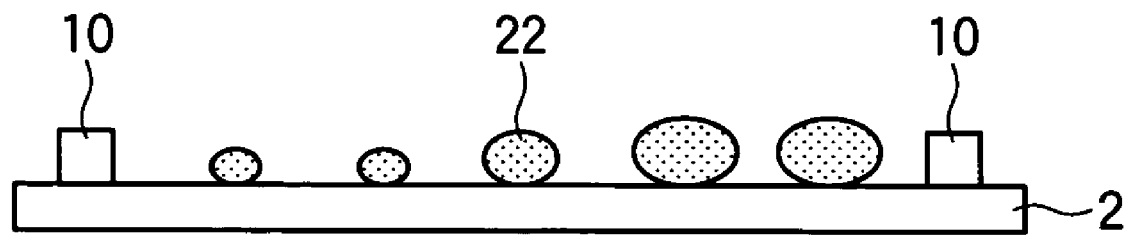
FIG. 8 is a sectional view showing a state where the liquid crystal 22 is dropped on the TFT substrate 2 in the method of manufacturing a liquid crystal display device using a one drop fill method according to the second embodiment of this invention.

FIG. 8 is a sectional view showing a state where the liquid crystal 22 is dropped on the TFT substrate 2. It shows a state where the dropping quantity of one drop of the liquid crystal 22 is changed every dropping position. When changing the dropping quantity of the liquid crystal 22, first, the cell gap is measured in advance by a technique similar to the technique used in the first embodiment, and the distribution of the cell gap width is grasped. In the case where the cell gap is relatively narrow on the left side from the center of the laminated TFT substrate 2 and CF substrate 4 and the cell gap is relatively broad on the right side, as shown in FIGS. 7A and 7B, the dropping quantity of the liquid crystal 22 is reduced in the area on the left side with the relatively narrow cell gap and the dropping quantity of the liquid crystal 22 is increased in the area on the right side with the relatively broad cell gap, as shown in FIG. 8.

As this is done, the dropping quantity and the spreading speed of the liquid crystal 22 in the cell gap become even irrespective of position and become substantially equal to those in the reference dropping control state, as in the first embodiment. Therefore, it is possible to manufacture the liquid crystal display panel 28 in which the liquid crystal 22 does not contact the unhardened seal material 10 and the contamination area 30 is not generated, or in which the non-injection area 32 is not generated where the liquid crystal 22 is not injected within the frame of the seal material 10.

Moreover, similar effects can be achieved by a technique of decreasing the number of times the liquid crystal 22 is dropped in the area with the narrow cell gap width and increasing the number of times the liquid crystal 22 is dropped in the area near the seal material 10 on the right side with the broad cell gap width, without changing the dropping quantity of one drop of the liquid crystal 22, as described with reference to FIG. 3C in the first embodiment.

Figure 9:
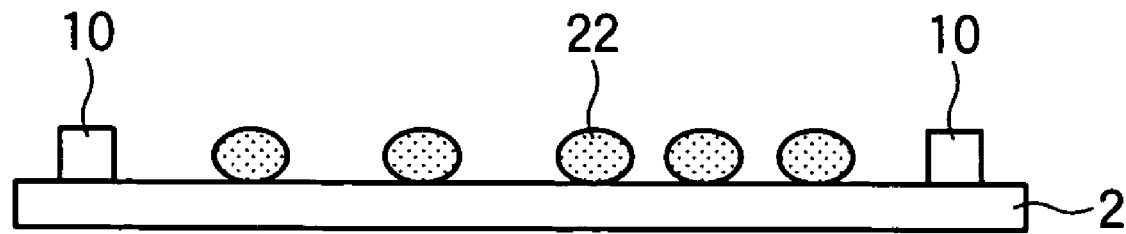
FIG. 9 is a sectional view showing a state where the liquid crystal 22 is dropped on the TFT substrate 2 in the method of manufacturing a liquid crystal display device using a one drop fill method according to the second embodiment of this invention.

FIG. 9 is a sectional view showing a state where the liquid crystal 22 is dropped on the TFT substrate 2. It shows a dropping control state where the interval of the dropping positions of the liquid crystal 22 is changed in an area including the vicinity of the seal material 10 on the basis of the distribution of the cell gap width acquired in advance. In the case where the cell gap is relatively narrow on the left side from the center of the laminated TFT substrate 2 and CF substrate 4 and the cell gap is relatively broad on the right side, as shown in FIGS. 7A and 7B, the interval of dropping the liquid crystal 22 is broadened in the area on the left side with the relatively narrow cell gap and the interval of dropping the liquid crystal 22 is narrowed in the area on the right side with the relatively broad cell gap, as shown in FIG. 9.

As this is done, the dropping quantity and the spreading speed of the liquid crystal 22 in the cell gap become even irrespective of position and become substantially equal to those in the reference dropping control state, as in the first embodiment and the case shown in FIG. 8. Therefore, it is possible to manufacture the liquid crystal display panel 28 in which the liquid crystal 22 does not contact the unhardened seal material 10 and the contamination area 30 is not generated, or in which the non-injection area 32 is not generated where the liquid crystal 22 is not injected within the frame of the seal material 10.

The one drop fill apparatus according to this embodiment is similar to the one drop fill apparatus 60 of the foregoing embodiment and therefore will not be described further in detail.

According to this embodiment, the dropping quantity of the liquid crystal 22 can be increased or decreased and the dropping position of the liquid crystal 22 can be changed on the basis of the distribution of the cell gap width. Therefore, even if the cell gap width is uneven, contamination of the liquid crystal 22 by the seal material 10 and local generation of a non-injection area where the liquid crystal 22 is not injected can be reduced satisfactorily. Moreover, even if the cell gap width is unevenly distributed, the liquid crystal 22 can be evenly spread within the cell gap. Furthermore, since the one drop fill apparatus 60 can be applied, product defects of the liquid crystal display device can be reduced without increasing the tact time in the step of dropping the liquid crystal 22.

Third Embodiment

Figure 10A:
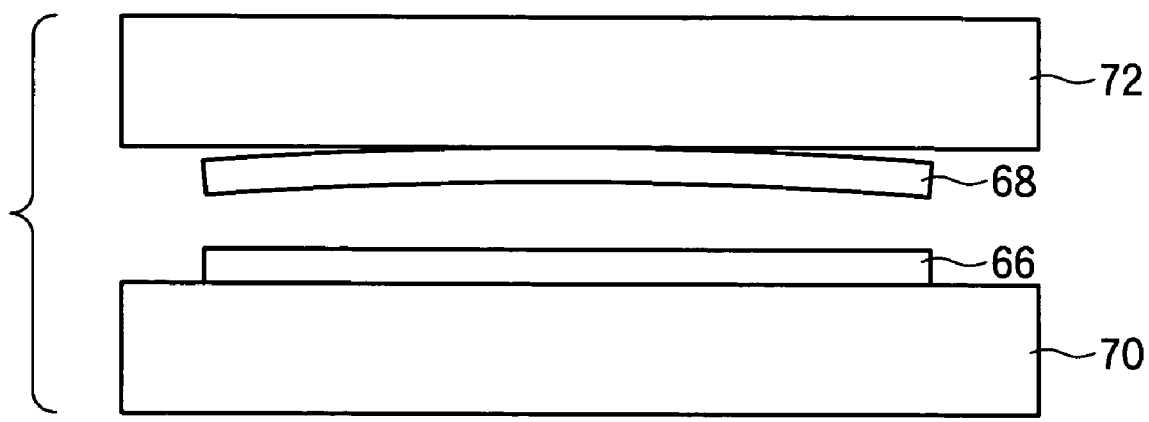
FIGS. 10A and 10B are sectional views showing a state where a TFT mother substrate 66 and a CF mother substrate 68 are set on a mother substrate lower plate 70 and a mother substrate upper plate 72, respectively, in a method of manufacturing a liquid crystal display device using a one drop fill method according to a third embodiment of this invention.

A method of manufacturing a liquid crystal display device using a one drop fill method and a one drop fill apparatus used for the method according to a third embodiment of this invention will now be described with reference to FIG. 10A, FIG. 10B, FIG. 11A and FIG. 11B. While the one drop fill method is applied to each liquid crystal display panel 28 in the above-described first and second embodiments, this embodiment is characterized in that the one drop fill method is used on a multiple-panel substrate (mother substrate) for simultaneously manufacturing plural liquid crystal display panels 28. FIG. 10A is a sectional view showing a state where a mother substrate 66 for TFT substrate and a mother substrate 68 for CF substrate are set on a mother substrate lower plate 70 and a mother substrate upper plate 72, respectively. Since the mother substrate 66 for TFT substrate and the mother substrate 68 for CF substrate have a size large enough to provide, for example, four liquid crystal display panels 28, the mother substrate 68 for CF substrate arranged on the upper side in the vertical direction is particularly susceptible to distortion. Therefore, when the mother substrate 66 for TFT substrate and the mother substrate 68 for CF substrate are laminated, the cell gap width is unevenly distributed. The cell gap is narrowed in the peripheral parts of the mother substrates 66 and 68, and the cell gap in the central part is broadened.

Figure 10B:
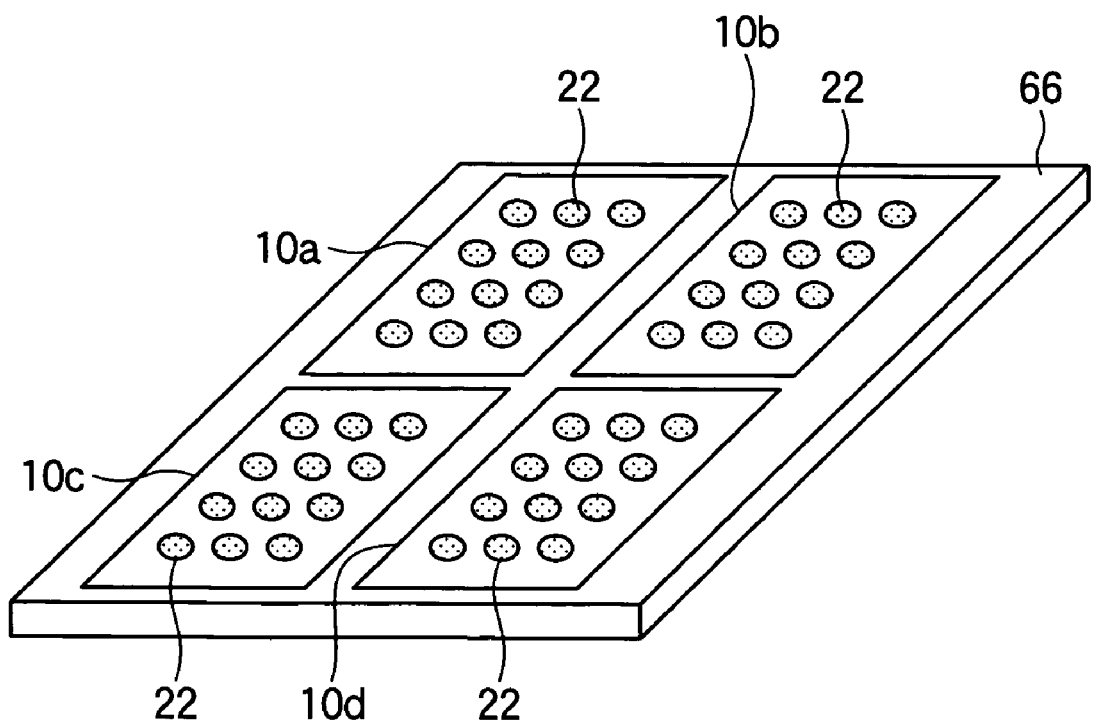

In this state, as shown in FIG. 10B, the dropping position and the dropping quantity of the liquid crystal 22 within individual frames of seal materials 10a, 10b, 10c and 10d applied on the mother substrate 66 for TFT substrate are controlled by reference dropping control shown in FIG. 3A. As this is done, since the cell gap is narrowed in the peripheral parts of the mother substrates 66 and 68, and the cell gap in the central part is broadened, the unhardened seal material components may contaminate the liquid crystal 22 near the seal materials 10a, 10b, 10c and 10d applied near the peripheral parts of the mother substrate 66 for TFT substrate, while an area where the liquid crystal 22 is not injected may be generated near the seal materials 10a, 10b, 10c and 10d applied in the central part of the mother substrate 66 for TFT substrate.

Figure 11A:
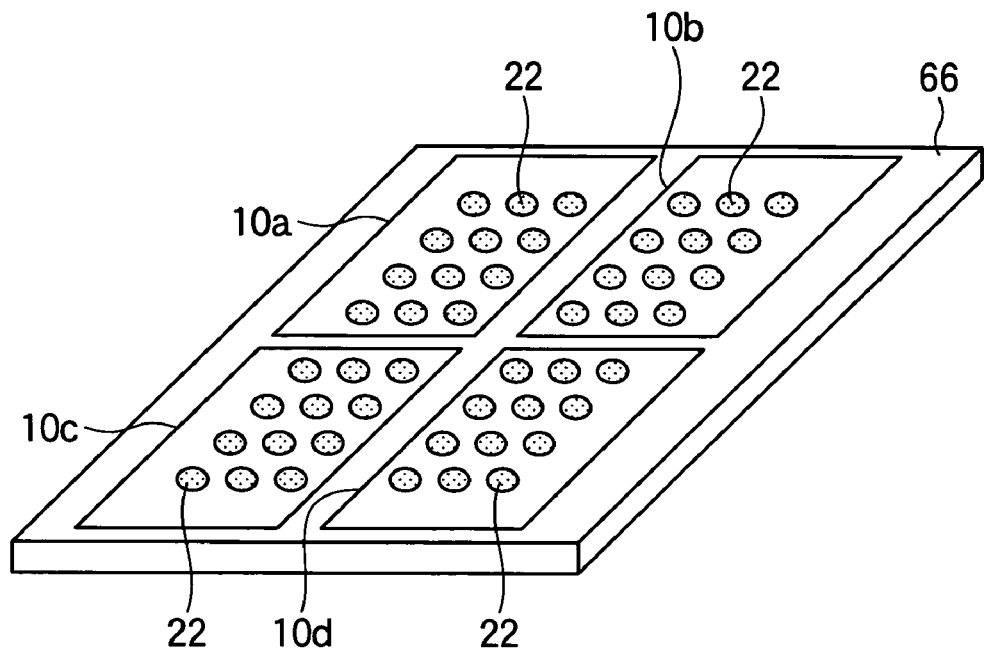
FIGS. 11A and 11B are perspective views showing states where dropping positions and dropping quantity of liquid crystal 22 are varied among seal materials 10a, 10b, 10c and 10d, in the method of manufacturing a liquid crystal display device using a one drop fill method according to the third embodiment of this invention.
Figure 11B:
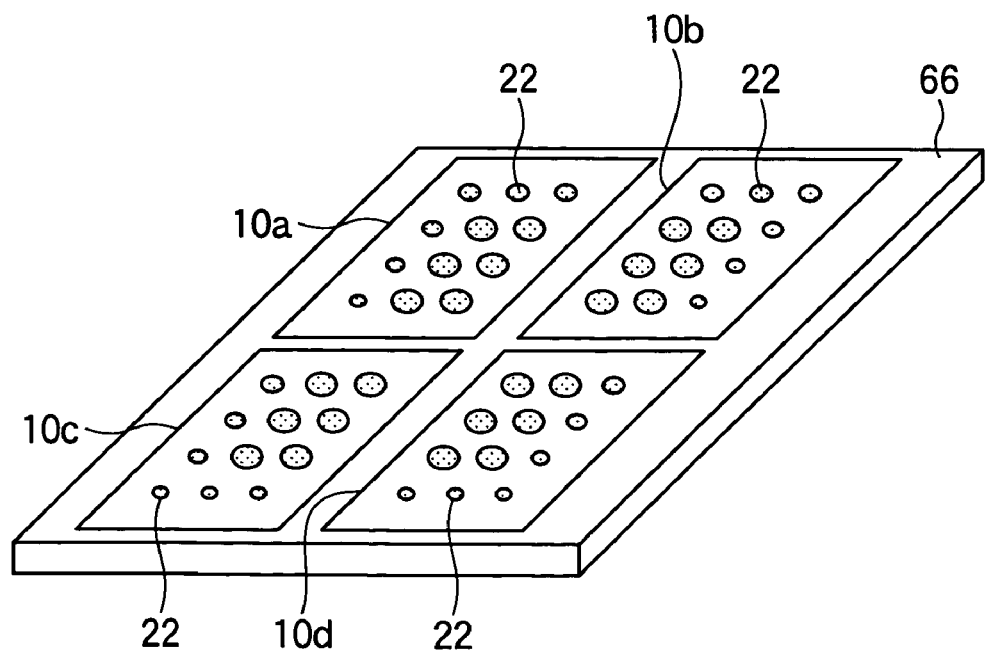

Thus, in this embodiment, the dropping position and the dropping quantity of the liquid crystal 22 dropped within the frames of the seal materials 10a, 10b, 10c and 10d are changed. FIGS. 11A and 11B are perspective views showing states where the dropping position and the dropping quantity of the liquid crystal 22 are changed for each of the seal materials 10a, 10b, 10c and 10d. FIG. 11A is a perspective view showing a state where the dropping position is changed. FIG. 11B is a perspective view showing a state where the dropping quantity is changed.

As the dropping positions of the liquid crystal 22 dropped near the seal materials 10a to 10d applied on the peripheral parts of the mother substrate 66 for TFT substrate are shifted away from the seal materials 10a to 10d in the vicinity and the dropping positions of the liquid crystal 22 dropped near the seal materials 10a to 10d applied in the central part of the mother substrate 66 for TFT substrate are shifted closer to the seal materials 10a to 10d in the vicinity, as shown in FIG. 11A, contamination of the liquid crystal 22 and generation of a non-injection area where the liquid crystal 22 is not injected can be prevented. Similarly, as the dropping quantity of the liquid crystal 22 dropped near the seal materials 10a to 10d applied near the peripheral parts of the mother substrate 66 for TFT substrate is reduced and the dropping quantity of the liquid crystal 22 dropped near the seal materials 10a to 10d applied in the central part of the mother substrate 66 for TFT substrate is increased, as shown in FIG. 11B, contamination of the liquid crystal 22 and generation of a non-injection area where the liquid crystal 22 is not injected can be prevented.

According to this embodiment, even in the case of simultaneously manufacturing the plural liquid crystal display panels 28 from the single mother substrate 66 for TFT substrate and the single mother substrate 68 for CF substrate, the dropping quantity of the liquid crystal 22 can be increased or decreased and the dropping position of the liquid crystal 22 can be changed on the basis of the distribution of the cell gap width. Therefore, even when the cell gap width between the laminated mother substrates 66 and 68 is uneven, contamination of the liquid crystal 22 by the seal material 10 and local generation of a non-injection area where the liquid crystal 22 is not injected can be reduced satisfactorily. Moreover, even when the cell gap width is unevenly distributed, the liquid crystal 22 can be evenly spread in the cell gap. Since the one drop fill apparatus 60 can be applied, product defects of the liquid crystal display device can be reduced without increasing the tact time in the step of dropping the liquid crystal 22.

This invention is not limited to the above-described embodiments and various modifications can be made.

Although the dropping quantity and the dropping position of the liquid crystal 22 are decided on the basis of the result of measurement of the cell gap in the above-described embodiments, this invention is not limited to this. For example, the spacing between the TFT substrate 2 setting surface of the lower plate 16 and the CF substrate 4 setting surface of the upper plate 18 is measured at plural points, and the dropping quantity and the dropping position of the liquid crystal 22 may be decided on the basis of the result of this measurement.

While the liquid crystal display panel 28 having the uneven distribution of the cell gap width is used as an example in the above-described embodiments, this invention is not limited to this. For example, in the case of manufacturing a liquid crystal display panel 28 having a large average cell gap width, the total dropping quantity of the liquid crystal 22 is increased but the material of the seal material 10 may contaminate the liquid crystal 22 dropped near the seal material 10. Thus, as the dropping position of the liquid crystal 22 dropped in the area near the seal material 10 is shifted away from the seal material 10, the liquid crystal 22 can be prevented from reaching the seal material 10 before the seal material 10 is hardened. This enables manufacture of a liquid crystal display panel 28 with a high cell gap in which generation of the contamination area 30 contaminating the liquid crystal 22 due to the unhardened seal material 10 is restrained.

Moreover, in the case of manufacturing a liquid crystal display panel 28 having a narrow cell gap width, the total dropping quantity of the liquid crystal 22 is decreased, but the liquid crystal 22 may not be able to reach the seal material 10 and a non-injection area where the liquid crystal 22 is not injected may be generated. Thus, as the dropping position of the liquid crystal 22 dropped near the seal material 10 is shifted closer to the seal material 10, the liquid crystal 22 can reach the seal material 10. This enables manufacture of a liquid crystal display panel 28 with a narrow cell gap in which a non-injection area of the liquid crystal 22 is not generated.

While the dropping quantity and the dropping position of the liquid crystal 22 are decided on the basis of the distribution of the cell gap width in the above-described embodiments, this invention is not limited to this. For example, the dropping quantity and the dropping position of the liquid crystal 22 may be decided on the basis of the hardening time of the seal material 10. In the one drop fill method, when the TFT substrate 2 and the CF substrate 4 are laminated, the liquid crystal 22 quickly spreads within the cell gap. After that, as a predetermined cell gap width is about to be reached, the spreading of the liquid crystal 22 becomes gentle and the liquid crystal 22 finally fills the entire cell gap. Even when the step of laminating the TFT substrate 2 and the CF substrate 4 is completed, the liquid crystal 22 gently spread within the cell gap until the seal material 10 is hardened. Therefore, the reaching position of the spreading liquid crystal 22 is proportional to the time from the start of the laminating step to the hardening of the seal material. If the pressurizing time in the laminating step is extended, the time for the seal material 10 to harden becomes longer, and during that time, the liquid crystal 22 may reach the unhardened seal material 10 and may be contaminated. Thus, in the case of extending the pressurizing time in the laminating step, if the dropping position of the liquid crystal 22 dropped in the area near the seal material 10 is shifted away from the seal material 10, the liquid crystal 22 cannot reach the unhardened seal material 10 and contamination of the liquid crystal 22 can be prevented.

Moreover, while either the dropping quantity or the dropping position is varied to prevent contamination of the liquid crystal 22 and generation of a non-injection area in the above-described embodiments, this invention is not limited to this. For example, similar effects can be achieved by varying both the dropping quantity and the dropping position of the liquid crystal 22.

What is claimed is:

1. A method of manufacturing a liquid crystal display device using a one drop fill method of performing liquid crystal injection by dropping liquid crystal on a first substrate formed with a seal material, causing a liquid crystal dropping side of the first substrate to face an opposite substrate, laminating the substrates in a vacuum, and restoring an atmospheric pressure, the method comprising the step of;

manufacturing a reference liquid crystal display panel for measuring a cell gap width using a one drop fill method using a predetermined reference quantity;

determining a variation that exists in a distribution of a cell gap width of the reference liquid crystal display panel for measuring a cell gap width within an area formed by a seal material;

controlling a dropping quantity of each drop of the liquid crystal on the first substrate, so that a distribution of a total quantity of the liquid crystal between the first substrate and the opposite substrate varies with the variation in the distribution of the cell gap width, while the total quantity of the liquid crystal between the first substrate and the opposite substrate remains constant at the predetermined reference quantity, wherein the distribution of the cell gap width is generated by degree of parallelism between facing surfaces of an upper plate and a lower plate of a substrate laminating apparatus or by distortion occurring on at least one of the first substrate and the opposite substrate of the reference liquid crystal display panel for measuring a cell gap width.

2. The method of manufacturing a liquid crystal display device as claimed in claim 1, wherein the dropping quantity of each drop of the liquid crystal is reduced in a first area where the cell gap width is relatively narrow with respect to another area between the first substrate and the opposite substrate where the cell gap width is relatively broad.

3. The method of manufacturing a liquid crystal display device as claimed in claim 2, wherein the number of times the liquid crystal is dropped is reduced in the first area where the cell gap width is narrow.

4. The method of manufacturing a liquid crystal display device as claimed in claim 3, wherein an interval between the dropped liquid crystal is broadened in the first area where the cell gap width is narrow.

5. The method of manufacturing a liquid crystal display device as claimed in claim 2, wherein if the first area where the cell gap width is narrow includes a vicinity of the seal material, a dropping position of each drop of the liquid crystal is shifted away from the seal material.

6. The method of manufacturing a liquid crystal display device as claimed in claim 1, wherein the dropping quantity of each drop of the liquid crystal is increased in a first area where the cell gap width is relatively broad with respect to another area between the first substrate and the opposite substrate where the cell gap width is relatively narrow.

7. The method of manufacturing a liquid crystal display device as claimed in claim 6, wherein the number of times the liquid crystal is dropped is increased in the first area where the cell gap width is broad.

8. The method of manufacturing a liquid crystal display device as claimed in claim 7, wherein an interval between the dropped liquid crystal is narrowed in the first area where the cell gap width is broad.

9. The method of manufacturing a liquid crystal display device as claimed in claim 6, wherein if the first area where the cell gap width is broad includes the vicinity of the seal material, a dropping position of each drop of the liquid crystal is shifted closer to the seal material.

10. The method of manufacturing a liquid crystal display device as claimed in claim 1, wherein a dropping position of each drop of the liquid crystal in the vicinity of the seal material is controlled on the basis of hardening time of the seal material.

* * * * *